May 5, 1959  C. E. LENZ  2,885,669
ELECTRICAL SIGNAL PROCESSING SYSTEM
Filed Oct. 26, 1953  2 Sheets-Sheet 1
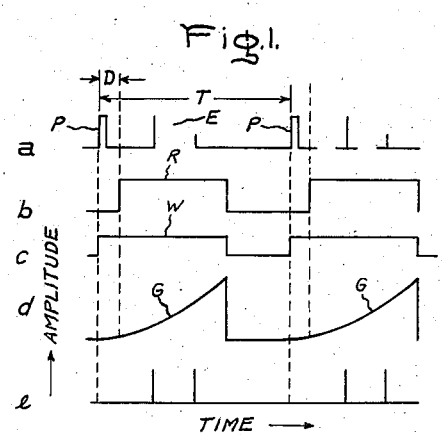
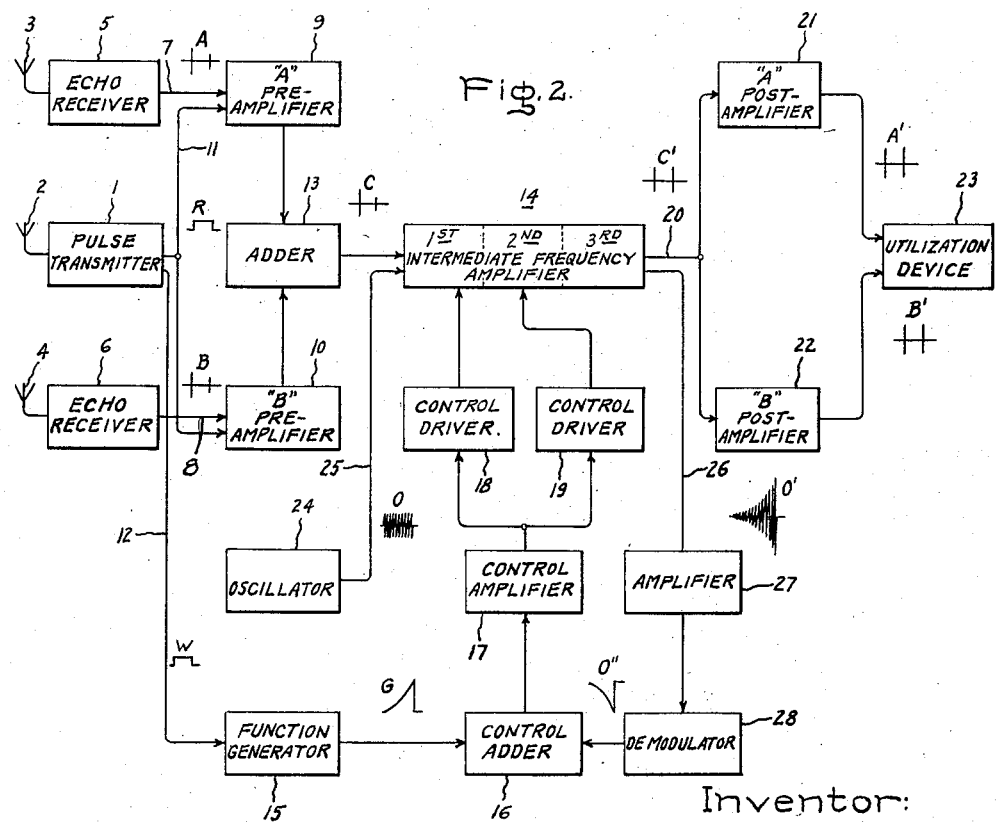
Inventor:
Charles E. Lenz,
by Charles M. Hutchins
His Attorney.

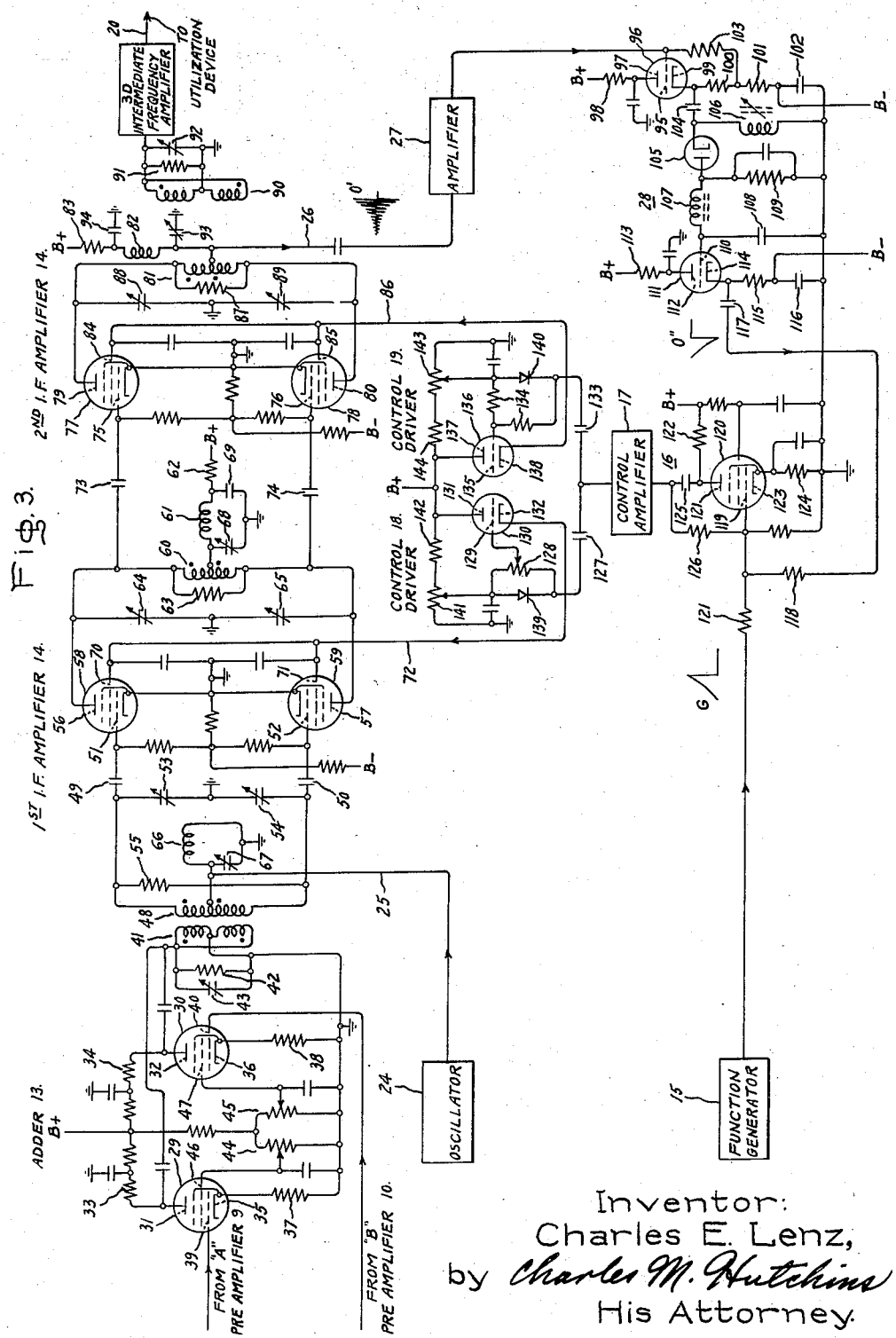

United States Patent Office 2,885,669
Patented May 5, 1959

2,885,669

ELECTRICAL SIGNAL PROCESSING SYSTEM

Charles E. Lenz, Omaha, Nebr., assignor to General Electric Company, a corporation of New York Application October 26, 1953, Serial No. 388,284

15 Claims. (Cl. 343—17.1)

The present invention relates generally to the processing of electrical signals and particularly to an arrangement for processing signals in a predetermined manner with time.

In the fields of seismography, radar detection, computation, etc., a need often arises for processing electrical signals as a predetermined function of time. Oftentimes the faithfulness of processing needs to be very exact, such that uncompensated variations and instabilities in the circuit parameters cannot be tolerated. If a plurality of different signals have to be processed in an identical manner, the problem of attaining over all faithfulness of processing becomes even more difficult.

For example, it is known that in a radar obstacle detection system of the type wherein pulses of electromagnetic energy are transmitted by a directive antenna toward objects in space and corresponding echo pulses from the objects are received and employed to determine the position of the object, the power of the returning echo diminishes very rapidly as the object recedes from the radar installation. Quantitatively the pulse echo power returned from the target varies inversely as the fourth power of the range and consequently the derived echo voltage varies inversely as the second power of range. To design a radar receiver capable of handling the extremely wide range of echo voltages without appreciable distortion is difficult. To comensate to some extent for this rapid change of echo signal strength with range, it is sometimes convenient to cause periodic variation of the receiver sensitivity in such a manner that at the time echoes are received from nearby objects, the received sensitivity is low, and as the echoes are received from objects at increasing ranges, the sensitivity increases. This accomplishment results in considerable over-all simplification of the receiver design. The practice of varying the sensitivity of a receiver with time is commonly known as sensitivity time control, or time-varying gain control.

One previously developed method employs a fixed, predetermined wave form for varying the gain of the intermediate frequency amplifier stages of the radar receiver. If the gain of each stage could be relied upon to vary linearly in relation to the gain control wave form, the over all instantaneous gain would vary in an ideal manner. However, the individuality of electron tube characteristics precludes such an eventuality, and the practically attainable performance falls short of this ideal. In more elaborate obstacle detection arrangements separately available multiple echoes need to be processed, that is, amplified simultaneously. If an attempt were made to apply the above-mentioned method of time-varying gain to the separate channels carrying these multiple echoes, it would be extremely difficult to maintain the gain perpetually equal in all channels. Any variation in the parameters of any of the separate channels, due to voltage conditions, temperature effects, aging etc., would immediately destroy the equality of time-varying gain control in these channels and lead to distortion of the echo information at the output of the receiver.

It is therefore an object of my invention to provide an arrangement permitting identical processing of a plurality of electrical signals.

Another object of my invention is to accurately process an electrical signal in a predetermined manner with time.

Another object of my invention is to derive an electrical signal of predetermined form.

Another object of my invention is to provide an accurate time-varying gain control for multi-channel radar systems.

A further object of my invention is to provide a monitoring system for accurately controlling the processing of electrical signals in a predetermined manner.

In accordance with one embodiment of my invention involving time-varying gain control of a dual-channel radar system, the two channels are accommodated by applying time-varying gain controls to but a single amplifier of adequate band width to include the echoes from the multiple channels at different center frequencies. The echoes are combined to traverse the common intermediate-frequency amplifier together with a monitoring-frequency signal. After separation at the output of the common amplifier, the amplified monitoring signal is demodulated, and its negative envelope is compared with a reference signal having a positive time-varying gain wave form. The resultant control signal is fed back with appropriate polarity to the amplifier to maintain the instantaneous gain of the amplifier proportional at all times to the amplitude of the reference signal.

The features of the present invention which are believed to be novel are set forth with particularity in the appended claims. The present invention itself, both as to its organization and manner of operation, together with further objects and advantages thereof, may best be understood by reference to the following description taken in connection with the accompanying drawings in which Fig. 1 is a group of wave forms useful in explaining the operation of a portion of the system shown in Figs. 2 and 3;

Fig. 2 is a block diagram of a radar object location system embodying my invention; and Fig. 3 is a detailed circuit diagram of certain elements represented in block form in Fig. 2.

In the following description of the radar system embodying the invention, certain frequency values are assigned at various portions of the system in order to facilitate an understanding of its operation. It is to be understood, however, that such frequency assignments are employed purely by way of example and are not to be construed in any way as limiting the scope of the invention.

Reference is now made to Fig. 1d, showing two cycles of a typical time-varying gain voltage wave form. The repetition period T of this wave form is the same as that of the transmitted pulse P, Fig. 1a, of an object locating system. The two pulses E, following each transmitted pulse, P constitute echo pulses received as reflections or reradiations of the transmitted pulses from two remotely located objects. The time spacing of these echoes from the related transmtited pulse corresponds to the different ranges of the detected objects. It should be noted that, in accordance with the previous discussion, the amplitudes of the echoes E are smaller for successively greater ranges. In order that all echoes reflected from equal size objects appear at the output of the receiver with equal amplitudes, independently of the range of the objects, the gain of the amplifying stages in the receiver need to be varied in a predetermined manner with time after each pulse transmission P. In an embodiment of the invention to be described shortly, a monitoring signal is caused to traverse the controlled amplifying stages being traversed by the echo signals, and the amplitude of the amplified monitoring signal, after demodulation, is compared with the standard or reference wave form shown in Fig. 1d to derive a resultant control signal. This latter signal is then applied to the screen grids of the electron discharge devices comprising the amplifying stages, to cause the over-all gain of the amplifier to vary in a desired parabolic manner with time. The amount of over-all gain variation is determined by the amplitude of the control-voltage wave form, while the rate of change of gain during the period of increase is determined by its slope.

In accordance with normal practice, echo signals are prevented from reaching the amplifying stages until a short time interval, D, after each pulse transmission P by means of a delayed range-gate voltage, for example as illustrated in Fig. 1b, which is normally available from the radar transmitter. This delayed range gate is a device commonly employed in radar obstacle location systems to prevent the receiver from responding to the transmitted pulse and the large echoes from nearby objects located closer than a prescribed minimum range, which would tend to overload and thereby paralyze the receiver for an appreciable time thereafter. The threat of such overloading and of consequent recovery difficulty makes gating of the echo channels in the receiver desirable. The range gate normally has a time duration corresponding to the maximum range of the radar, so that the receiver will convey only useful echoes to the utilization device and become unresponsive to noise signals existing beyond the maximum range and before the next echo reception period. It will be understood that the timing of the gain-control voltage is not necessarily limited to the range-gate cycle described but may be timed in whatever manner desired to effect a time-varying gain control at a proper period. The result of varying the amplifier gain from a condition of low sensitivity at the time of the pulse transmission P to one of high sensitivity at the prescribed maximum range of the radar system is to provide echoes of reduced dynamic amplitude range at the output of the receiver. Thus equal area objects result in equal amplitude echoes independently of range as shown in Fig. 1e. If the targets were of unequal areas the echoes available at the output of the receiver would have correspondingly unequal amplitudes. The result is improved information about the objects being located which is not distorted by echo attenuation with range.

Fig. 2 illustrates an embodiment of the invention in connection with a radar obstacle location system of the monopulse type wherein echo information is available in two separate channels. A novel arrangement is provided to vary the amplification of the echo signals available in the two channels identically and accurately in accordance with a prescribed time-varying gain control voltage of parabolic wave form. The system shown therein for the determination of obstacle ranges comprises a pulse transmitter 1 of any usual form adapted to radiate directively from an antenna 2, a train of suitable high-intensity short-period pulses to obstacles or objects (not shown) at different distances within a predetermined range. In a monopulse system, echoes may be received over a plurality of differently directed antennas and processed to yield desired obstacle-location information. For purposes of discussion we shall assume that two spaced antennas 3 and 4 having different directivities are employed to recieve the echoes reflected or emanating from remotely located obstacles and provide them on two separate channels for processing into the desirable obstacle-location information. The echoes may be considered as being received by separate receivers 5 and 6 connected to respective antennas 3 and 4. The echo receivers 5 and 6 may comprise radio frequency amplifying stages and converter stages of usual form for yielding respective echo signals A and B at different intermediate frequencies over channels 7 and 8. In a particular embodiment, the intermediate frequencies of echoes A and B were centered at 14 and 18 megacycles per second respectively and carried combined amplitude and phase modulation.

Before utilizing the echo signals available in the separate channels, it is desirable to realize the benefits of time-varying gain control as previously explained. Since it is difficult to maintain gains perpetually equal in more than one channel, the two channels are accommodated in accordance with one embodiment of my invention, by applying time-varying gain control to but a single amplifier of adequate band width to include the multiple channels at different center frequencies. The channels pass first through selective preamplifiers, then combine to traverse the common intermediate-frequency amplifier, and are finally separated by selected postamplifiers. Consequently, equal gain amplitude can be maintained continuously in both channels.

The processing of the electrical signals through a common amplifier is achieved in the following manner. The echo signals A and B are applied to respective preamplifying stages 9 and 10 of usual form adapted to amplify the echo signals without appreciable distortion while having sufficient skirt selectivity to minimize interchannel interference. The preamplifiers are normally inoperative, and respond only to a range gate voltage R available over lead 11 from the pulse transmitter 1 for passing the preamplified echo signals A and B to the adder circuit 13 to be added together. The range gate voltage R is of usual form, as for example, a conventional square wave timed with respect to the transmission of each pulse by transmitter 1. In a preferred embodiment, the range gate voltage is delayed to occur a small interval of time D after each pulse transmission as explained previously in connection with Fig. 1b.

The composite voltage C available from the adder 13 then traverses a common intermediate-frequency amplifier 14 of any desired number of stages. In order to obtain proper time-variable gain control of the amplifier 14, a function generator 15 of any suitable type is adapted to provide a reference voltage G of parabolic form. A conventional device for generating parabolic waves comprises a gated triangular wave generator in conjunction with either a squarer or an integrator. An improved arrangement employing the latter method is described in a copending application "Wave Forming Circuits," Charles E. Lenz, Serial No. 376,192 filed August 24, 1953, assigned to the same assignee.

Generator 15 is synchronized with the operation of transmitter 1 to generate a reference voltage G starting at the time of each pulse transmission P and ending at the conclusion of the range gate voltage R. Thus transmitter 1 may comprise a square wave generator triggered at the start of each pulse transmission for supplying the periodically occurring square waves W shown in Fig. 1c, over lead 12 to generator 15. In response to each of the applied waves W, generator 15 generates the reference voltage G, of parabolic form as shown in Fig. 1d. This reference voltage is then combined with another voltage, to be described shortly, in adder circuit 16 to yield a desired gain-control voltage. This control voltage is then applied through control amplifier 17 to the control driver stages 18 and 19. Thereupon, the output of the control driver stages is used to control the gain of the first and second intermediate-frequency stages of the intermediate-frequency amplifier 14. The detailed functioning of circuits 16 through 19 will be described shortly. Suffice it to say that the echoes C of unequal amplitude undergo unequal amplifications in amplifier 14 in accordance with their different times of arrival at the receivers 5 and 6 as referenced from the instant of the related pulse transmissions from transmitter 1. The parabolic configuration of the reference voltage G is selected so that the amplified echoes C' appear at the output of receiver 10 with equal amplitudes on lead 20. The echoes are now in suitable form for processing into the desirable obstacle-location information. The properly amplified echoes C' are then separated in postamplifiers 21 and 22 before passing to the utilization device 23. As in the case of the preamplifiers 9 and 10, the postamplifiers are made properly selective to avoid interchannel interference, and excessive distortion. The utilization device may be of any form adapted to extract the desirable obstacle-location information contained in the modulations of the signals available in the two channels.

It should be noted that the probability of achieving identical time amplification control of the echoes available in separate channels has been materially improved by resorting to a common intermediate-frequency channel for processing all of the echoes. However, it must be recognized that the gain of each stage in the common amplifier still may not vary linearly with the gain-control voltage applied to that stage. The individuality of electron tube characteristics and instability of circuit parameters, as previously mentioned, preclude such an eventuality. To insure that the common intermediate-frequency amplifier gain varies as a prescribed function of time with relative independence from electron tube characteristics, and associated circuit irregularities, an arrangement in accordance with an embodiment of my invention is provided which employs feed-back together with continuous monitoring of the instantaneous gain.

The monitoring function is achieved by the use of an oscillator 24 which supplies unmodulated amplitude oscillations O over lead 25 to the common intermediate-frequency amplifier 14. These monitoring oscillations are amplified in the intermediate-frequency stage 14 along with echoes C. The monitoring oscillations are separated in the output stage of amplifier 14 and appear as oscillations O' over lead 26. It should be noted that the oscillations now contain an amplitude-modulation envelope dependent upon the time-varying gain control action of amplifier 14. The modulated oscillations O' are amplified in amplifier 27 before being demodulated in a conventional manner in a demodulator 28 to yield a negative-going envelope wave form O''. The instantaneous amplitude of the demodulated oscillations is compared in the adder 16 with the positive reference voltage G available from the function generator 15. The resultant sum of these two signals, indicative of the faithfulness of the amplification variation of amplifier 14 relative to the instantaneous amplitude of the reference voltage G, is fed back with appropriate polarity through amplifier 17 and drivers 18 and 19 to screen grids in the gain-control circuits of the amplifier 14. Sufficient gain through the control amplifier 17 tends to make the instantaneous gain of amplifier 14 proportional at all times to the output of the function generator G.

Reference is now made to the circuit diagrams of Fig. 3 which illustrate in greater detail some of the circuitry employed in the arrangement of Fig. 2. Wherever practical, the reference symbols employed in describing the functioning of the block diagram of Fig. 2 are repeated in describing corresponding components of Fig. 3.

The adder 13, employed to combine the echoes A and B available from preamplifiers 9 and 10 into the common pulse train C, consists of two pentodes 29 and 30 having their anodes 31 and 32 energized through resistor chains 33 and 34, respectively from B+. The cathodes 35 and 36 of these tubes are connected through respective resistors 37 and 38 to ground. Pentodes 29 and 30 serve to add the A and B echoes, applied to their respective control grids 39 and 40, in the common plate-load circuit comprising center-tapped primary transformer winding 41, with sections polarized as shown, and resistor 42, and condenser 43. The plate load circuit is dimensioned to provide a satisfactorily flat response over the desired echo-signal frequency band when combined with the remaining tuned circuits of the common intermediate-frequency amplifier channel. In a preferred embodiment the signals A and B each occupy a 2-megacycle-per-second half power band width centered at 14 and 18 megacycles per second, respectively. Provision is made in the adder to equalize the gain of the pentodes 29 and 30 by adjustment of respective potentiometers 44 and 45 connected as voltage dividers between B+ and ground and having their movable taps connected to the screen grids 46 and 47 of the adder tubes.

The composite signal C developed in the primary transformer winding 41 is coupled through the balanced secondary winding 48, associated therewith, and coupling condensers 49 and 50 to the input electrodes 51 and 52 of the first stage of the intermediate-frequency amplifier 14. Adjustable condensers 53 and 54, together with resistor 55 and the secondary winding 48, are tuned to provide a flat response over the desired echo-signal frequency range when combined with the remaining tuned stages of the amplifier 14. The plate electrodes 56 and 57 of pentodes 58 and 59, operating as differential amplifiers, are energized through the center-tapped transformer winding 60, inductance 61, and resistor 62 from B+. Thus, amplified versions of the push-pull signals applied to control electrodes, or grids 51 and 52 are developed across the tuned differential output circuit comprising the center-tapped inductance 60, resistor 63, and the variable condensers 64 and 65. This output circuit is tuned to contribute towards an overall flat response for the echo-signal frequencies when considered with the other tuned intermediate-frequency stages.

To monitor the faithfulness of time-varying gain control exhibited by the intermediate-frequency amplifier channel 14, a monitoring signal of fixed amplitude is applied through a common input circuit of the differential amplifier tubes 58 and 59. Since the instantaneous differential-mode gain of a balanced differential amplifier is at all times proportional to the instantaneous common-mode gain, the monitoring signal in being passed through the common mode acquires an amplitude modulation which is proportional to the instantaneous differential and common-mode gains. In the present instance the monitoring signal from oscillator 24 is applied over lead 25 through winding 48 and condensers 49 and 50 to the control grids of 51 and 52 to be amplified along with the echoes signals by tubes 58 and 59. Inductance 66 and condenser 67 constitute the common-mode input circuit for the monitoring signal and are accordingly tuned to the monitoring frequency. The inductance 61, connected between the center tap of inductance 60 and resistor 62, and condenser 68, constitute the common-mode output circuit for the monitoring signal and consequently are tuned to the monitoring frequency. Condenser 69 acts as a bypass for alternating-current signals to ground. The screen electrodes 70 and 71 are furnished with gain-control voltage over lead 72 in a manner to be described shortly.

The amplified echo signals available across center-tapped inductance 60, and the amplified monitoring signal available across inductance 61 are applied through coupling condensers 73 and 74 to the control electrodes 75 and 76 of pentodes 77 and 78 acting as the second differential amplifier stage of the intermediate-frequency channel 14. These pentodes have their plate electrodes 79 and 80 energized through center tapped transformer winding 81, inductance 82, and resistor 83 from B+. The screen electrodes 84 and 85 are energized with the time-varying gain control voltage available over lead 86 in a manner to be described shortly. The amplified composite echo signals are developed across the differential output circuit comprising winding 81, resistor 87 and condensers 88 and 89. These elements are tuned to provide the required flat frequency response to the echo signals when considered with the other tuned intermediate-frequency circuits. The amplified echo signals are coupled through the secondary transformer winding 90, associated with the primary winding 81, to the 3rd intermediate-frequency amplifier stage of channel 14. Winding 90, resistor 91, and condenser 92 are tuned to contribute to an overall flat frequency response for the echo signals. This third intermediate-frequency stage may be similar to the intermediate-frequency stage comprising pentodes 58 and 59 described earlier. The output of the third intermediate-frequency amplifier stage is then applied over lead 20, to the postamplifiers 21 and 22, and then to the utilization device as shown in Fig. 2.

The monitoring signal, after amplification by pentodes 79 and 80, is developed across the common-mode output circuit comprising inductance 82 and condenser 93 which are tuned to the monitoring-signal frequency. Condenser 94 acts as a bypass for the alternating-current signals to ground. The amplitude-modulated monitoring signal is effectively separated from the echo signals by the common-mode output circuit and made available on lead 26 for comparison with the reference voltage G. First, however, amplifier 27 amplifies the modulated monitoring signal O′ to a suitable level for demodulation by demodulator 28. The amplified monitoring signal is applied to the control electrode 95 of triode 96, operating as a cathode follower. Its anode 97 is connected through a resistor 98 to B+ and its cathode 99 is connected through resistors 100 and 101 and condenser 102 to ground. Operating bias for triode 96 is obtained by application of the portion of B— voltage developed across resistor 100, between the cathode 99 and the grid 95 through the resistor 103. The monitoring signal available at the cathode 99 is then coupled through condenser 104 to the rectifying diode 105 acting as the demodulator. Inductance 106 contributes to a suitable load for cathode-follower triode 96 and is tuned together with its stray capacity to the monitoring-signal frequency. Diode 105 rectifies the wave form O′ after amplification in 27 to yield its negative-going envelope after smoothing in the low-pass filter circuit comprising inductance 107, condenser 108, and the resistor-condenser combination 109. After smoothing in the low-pass filter, the negative-going envelope is applied to the control electrode 110 of the triode 111 connected as a cathode follower. The anode 112 is connected through resistor 113 to B+, while the cathode 114 is connected through resistor 115 and condenser 116 to ground. Operating bias for the triode 111 is obtained from B—, connected to the junction of condenser 116 and resistor 115.

The negative-going envelope O″ available at the cathode of triode 111 is coupled through condenser 117 and resistor 118 to the control electrode 119 of pentode 120 together with the reference voltage G available from generator 15 through resistor 121. Pentode 120 has its anode 121 connected through the load resistor 122 to B+ and its cathode 123 connected through the parallel resistor-condenser circuit 124 to ground. Pentode 120 acts to add the signalc G and O″ at its anode 121. The resultant sum of these two signals is then coupled through condenser 125 to the control amplifier 17. Resistor 126 couples a portion of the resultant error or control signal back to the control electrode 119 to improve the linear response of this circuit.

The control signal, after suitable amplification in amplifier 17, is applied through condenser 127 and potentiometer 128 to the control electrode 129 of triode 130. Triode 130 operates as a cathode follower with its anode 131 connected to B+ and its cathode 132 connected by lead 72 to the screen electrodes 70 and 71 of the first intermediate-frequency amplifier stage 14. Thus, the control signal resulting from a comparison of the reference voltage and demodulated monitoring voltage is used to control the screen potential of the first intermediate-frequency amplifier stage, and consequently the gain thereof. In similar manner, the control signal from amplifier 17 is applied through condenser 133 and resistive voltage divider 134 to the control electrode 135 of triode 136 acting as a cathode follower. The anode 137 of this triode is connected directly to B+ while its cathode 138 is connected by the lead 86 to the screen electrodes 84 and 85 of the second intermediate-frequency amplifier stage. Thus the control signal resulting from a comparison of the reference voltage and demodulated monitoring voltage is also used to control the voltage applied to the screens of the second intermediate-frequency amplifier stage, and hence the gain thereof.

Control drivers 18 and 19 are provided because the low-frequency control amplifier 17 is not capable of supplying the moderate screen power required for feed-back control of intermediate-frequency amplifier stages.

In addition, the control drivers 18 and 19 fulfill the more important function of establishing a suitable, selectively fixed, voltage level from which the gain control voltage may vary in a positive going direction during each of its periods. This voltage is termed the quiescent driver voltage, since it establishes the voltage at the screen grids of the gain controlled amplifier stages during the time when no variable, gain control voltage is available from amplifier 17. The level of this positive, quiescent driver voltage for the grids of tubes 130 and 136 is selectively determined by adjustment of the movable taps on potentiometers 141 and 143 connected in respective voltage divider chains to B+ as previously mentioned. Thus, the positive-going, gain control voltage from amplifier 17 is superimposed on the quiescent voltage level established by potentiometers 141 and 143 during each period and for the duration of the voltage waveform G available from generator 15. The resultant waveform is transmitted by cathode follower action of driver tubes 130 and 136 to the screens 70, 71, 84 and 85 of amplifier tubes 58, 59, 77, and 78 to accurately control the overall gain of channel 14 in accordance with the parabolic form of the reference voltage, G, available from generator 15.

Diodes 139 and 140 are connected across potentiometer 128 and voltage divider 134 to insure that the voltage of the grids 129 and 135 never go below the positive level established by the movable taps on potentiometers 141 and 143. For example, the diodes are so poled, that if the voltage at the output sides of condensers 127 and 133 should tend to go negative with respect to the voltage at the movable taps of 141 and 143, they would conduct and clamp the grids 129 and 135 directly to the quiescent voltage sources 141 and 143.

Potentiometer 128 also acts as a relative-gain control to correlate the driving voltages supplied to the screens in the two feed-back controlled common intermediate-frequency amplifier stages. Although the gain of the second control driver 19 is fixed, the gain of the first driver 18 is adjustable by means of the movable tap on potentiometer 128. The control drivers just discussed constitute the last necessary link in the dual-channel intermediate-frequency amplifier incorporating time-varying gain control. When combined as shown in Fig. 3, these circuits form a theoretically satisfactory system whose performance is capable of providing gain-control accuracy of at least 3% in one particular embodiment. This means that under ideal conditions the instantaneous intermediate-frequency gain would deviate from the true parabolic rise by no more than the same percentage.

Many different settings of the relative-gain control 128 can result in gain control demodulator outputs similar to that already mentioned. Nevertheless, this control affects the waveform of the error voltage from the control adder and of the screen grid voltages supplied to both feed-back controlled common intermediate-frequency amplifier stages.

Although the present invention has been described in terms of a two-stage, controlled, or time-varying gain amplifier, in which the control signal, resulting from a comparison of the time-variable gain reference voltage and the demodulated monitoring signal, is applied to both stages, it should be understood that the invention may be suitably employed in other circuit configurations. Perhaps this can best be explained by a general consideration of $n$-cascaded feedback-controlled stages, identical except as otherwise explained, wherein all $n$ stages may not be traversed by either the monitoring voltage, or the input signal, corresponding to the echo signals in the embodiment of Fig. 3. Under these conditions the amplitude of the input signal $A(t)$ will be modified in a manner approximately proportional to a power, $$\frac{a}{b}$$

of the function generator output $B(t)$, that is, a power of the amplitude of the reference voltage, as follows:

$$\text{Output signal} = A(t)B(t)^{\frac{a}{b}}$$

where $a$ = number of feedback-controlled stages traversed by the input signal $b$ = number of feedback-controlled stages traversed by the monitoring voltage, and $(t)$ indicates that $A$ and $B$ may be functions of time, and $A(t)$ and $B(t)$ are greater than zero Thus in the arrangement of Fig. 3, $A(t)$ is equal to the applied echo signals, C, $B(t)$ is the parabolic waveform G, and $$\frac{a}{b} = \frac{2}{2} = 1$$

Thus the amplitude of the input signal is made directly proportional to the reference voltage. It can be shown that $a$ and $b$ can only be integers up to and including $n$, and the ratio $$\frac{a}{b}$$

may be equal to, greater than, or smaller than 1. If the monitoring and input signals traverse all of the feedback or gain controlled stages, then the stages need not be identical. However, if either the monitoring or input signals do not traverse all gain controlled stages, and the stages are different, then the simple formula will not suffice. However, with a knowledge of the differences of these stages, the output signal may be readily derived.

Some of the possible, although by no means exhaustive, derivations possible with the present invention is where $A(t)=B(t)$. The present arrangement would permit derivation of powers of $A(t)$, equal to or differing from 1, depending on the value of the ratio $$\frac{a}{b}$$

Or, if $B(t)$ is some inverse power of $A(t)$, as for example $$\frac{1}{A(t)}$$

various negative powers of the function $A(t)$, equal to or differing from 1, may be derived. In a similar manner functions of different powers of time may be compared, as for example where $A(t)=t^2$ and $B(t)=t$, by dimensioning the configuration of cascaded stages to provide a suitable ratio of $$\frac{a}{b}$$

which would result in a constant or predetermined output for proper phasing of $A(t)$ and $B(t)$, etc. Any deviation from this constant or predetermined output would be indicative of a change in the input or monitoring signals.

Although operation in the manner described tends only to compensate for characteristic irregularities of the tubes in stages through which the monitoring voltage passes, the use of identical tubes in all feedback controlled stages still tends to minimize the significance of tube characteristics in influencing overall operation.

Previously it was mentioned that the overall gain of the two controlled stages in Fig. 3, can be caused to be approximately proportional to the amplitude of the reference voltage from generator 15. Actually the overall gain of the gain-controlled stages of a given configuration traversed by the monitoring signal can be made as nearly proportional to the reference voltage amplitude as desired, regardless of the circuit characteristics of these stages, by an appropriate control voltage-amplifier gain. It is only necessary to properly proportion the amplitude of the control voltage relative to the amplitude of the reference voltage to achieve a desirable degree of faithfulness of overall gain control with respect to the reference voltage waveform. For example, in the embodiment of Fig. 3, it was possible to obtain a modulated control voltage envelope corresponding within at least 3% to the reference voltage wave shape. By increasing the gain of the control amplifier 17 without changing the function-generator output level, or more generally stated, changing the gain of the loop comprising the amplifier 27, demodulator 28, adder 16, amplifier 17 and drivers 18 and 19, the accuracy of the overall gain control of the intermediate-frequency channel 14 can be improved. This is accomplished despite any irregularities or instabilities associated with the circuit parameters of the intermediate-frequency channel.

While particular embodiments of the present invention have been shown and described, it will be obvious to those skilled in the art that changes and modifications may be made without departing from this invention in its broader aspects and therefore the aim in the appended claims is to cover all such changes and modifications as fall within the true spirit and scope of the invention.

What I claim as new and desire to secure by Letters Patent of the United States is:

1. An arrangement for processing a first electrical signal having a given characteristic modulation, comprising a source of a second signal, an electrical circuit having a given number of cascaded stages, said circuit adapted to modulate said given characteristic of applied signals, means for simultaneously applying said first and second signals to said electrical circuit, a source of a third electrical signal having a similar characteristic modulation, means for removing said second signal from one of said stages, means for comparing the similar characteristic modulation of said removed second signal with said similar characteristic modulation of said third signal to derive a control signal, means for applying said control signal to selected stages of said electrical circuit to modulate said applied first and second signals in accordance with a similar characteristic of said control signal, and means for removing said first signal from one of said selected stages.

2. An arrangement for processing a first electrical signal comprising an amplifier having a given number of cascaded stages, a source of a second electrical signal having a given time-amplitude characteristic, means for simultaneously applying said first and second signals to said amplifier, a source of a third electrical signal having a given time-amplitude characteristic, means for removing said second signal from said amplifier after passage through a number of said stages, means for comparing the amplitudes of said removed second signal and said third signal to derive a control signal, means for controlling the gain of selected stages of said amplifier in accordance with the amplitude of said control signal, and means for removing said first signal from said amplifier after passage through a number of said selected stages.

3. In combination, means for periodically transmitting pulses of electromagnetic energy toward a remote object, a source of electrical monitoring oscillations of constant amplitude, means for simultaneously receiving said monitoring oscillations and echo pulses of said transmitted electromagnetic energy returned from said object, a circuit for periodically varying the sensitivity of said receiving means as a parabolic function of time, comprising a source of periodic signals having an instantaneous amplitude during each period varying as said function of time, and means for comparing the instantaneous amplitude of said received electrical monitoring oscillations with the instantaneous amplitude of said periodic signals to derive a control signal, and means for varying the sensitivity of said receiving means in accordance with said control signal.

4. In combination, means for transmitting pulses of electromagnetic energy toward remote reflecting objects, a source of electrical monitoring oscillations of constant amplitude, means for receiving echo pulses of said transmitted electromagnetic energy returned from said reflecting object and said monitoring oscillations, a circuit for varying the sensitivity of said receiving means as a predetermined function of time, comprising a source of a signal having an instantaneous amplitude varying as said function of time and means for comparing the instantaneous amplitude of said received electrical monitoring oscillations with the instantaneous amplitude of said signal to derive a control signal, and means for varying the sensitivity of said receiving means in accordance with said control signal.

5. An arrangement for identically processing a plurality of separate electrical signals comprising a source of a first signal of constant amplitude, a common amplifying channel, means for applying said electrical signals and said first signal to said channel for amplifying said first signal and said electrical signals, means for varying the gain of said channel as a given function with time, comprising a source of a second signal having an amplitude varying as said function with time, means for separating said first signal and electrical signals after amplification, means for continuously comparing the amplitude of said separated amplified first signal with said second signal amplitude to obtain a third signal, and means for modifying the gain of said channel in accordance with the amplitude of said third signal.

6. An arrangement for identically processing a plurality of separately available electrical signals comprising a source of a first signal of constant amplitude, a common amplifying channel, means for simultaneously applying said electrical signals and said first signal to said channel for amplifying said first signal and said electrical signals, means for varying the gain of said channel as a given function with time, comprising a source of a second signal having an amplitude varying as said function of time, means for separating said amplified first signal from said amplified electrical signals, means for comparing the amplitude of said separated first signal and said second signal to obtain an error signal, means for modifying the gain of said channel in accordance with the amplitude of said error signal, means for separating said amplified electrical signals, and means for utilizing said separated amplified electrical signals.

7. An arrangement for processing a first signal, comprising an electrical circuit, a source of a second signal having an unmodulated amplitude, means for simultaneously applying said first and second signals to said circuit to be amplitude modulated, a source of a third signal having an amplitude modulated as a function of time, means for amplitude demodulating said amplified second signal, and means for comparing the amplitude of said demodulated second signal with that of said third signal to derive a control signal, and means for feeding back said control signal with appropriate polarity to said circuit for controlling the instantaneous amplitude modulation by said amplifier.

8. An arrangement for deriving an output electrical signal having a desired amplitude modulation comprising a first and a second amplitude modulated signal, an amplitude modulator circuit, means for simultaneously applying said first and second signals to said circuit to be amplitude modulated, a source of a third, amplitude modulated signal, means for comparing the instantaneous amplitude of said third signal and said amplitude modulated second signal to derive a fourth signal, and means for applying said fourth signal to said circuit to modulate the amplitude of said first and second signals in relation to the amplitude modulation of said third signal, and means for removing said amplitude modulated first signal from said circuit as said output signal.

9. An arrangement for identically processing a plurality of separate and distinct electrical signals comprising a source of a monitoring signal of constant amplitude, a time variable gain control signal, a common amplifying channel comprising push pull amplifying stages connected in cascade means for applying said monitoring signal in push push relationship and said electrical signals in push pull relationship simultaneously to said stages to be amplified, means for varying the gain of said channel in relation to the instantaneous amplitude of said time variable gain signal comprising means for separating said amplified monitoring signal and amplified electrical signals, means for continuously comparing the amplitude of said separated monitoring signal with that of said time variable gain signal to obtain an error signal, and means for modifying the gain of said channel in accordance with the amplitude of said error signal.

10. An arrangement for processing a first electrical amplitude signal A to derive an output amplitude signal equal to $$AB^{\frac{a}{b}}$$

comprising an amplifier having a plurality of cascaded stages, a source of a second constant amplitude electrical signal, means for simultaneously applying said first and second signals to said amplifier, a source of a third electrical amplitude signal B, means for removing said second signal from said amplifier after passage through a number $b$ of said stages, means for combining the amplitudes of said removed second signal and said third signal to derive a differential amplitude control signal, means for controlling the gain of said stages of said amplifier in accordance with the amplitude of said control signal, and means for removing said first signal from said amplifier after passage through a number $a$ of said gain controlled stages.

11. In combination, means for transmitting pulses toward a remote object, a source of monitoring waves of constant amplitude, means for receiving said monitoring waves and the transmitted pulses returned from said object, a circuit for periodically varying the sensitivity of said receiving means as a predetermined function of time, said circuit comprising a source of signals having an instantaneous amplitude during each period varying as said function of time, and means for comparing the instantaneous amplitude of said received monitoring waves with the amplitude of said signals to derive a control signal, and means for varying the sensitivity of said receiving means in accordance with said control signal.

12. An arrangement for processing a first electrical signal $A^n$ to derive an output signal equal to $$A^n B^{\frac{na}{b}}$$

where $n$ is any positive or negative integer, said arrangement comprising an amplifier having a plurality of cascaded stages, a source of a second electrical signal having a constant amplitude, means for simultaneously applying said first and second signals to said amplifier, a source of a third electrical signal $B^n$, means for removing said second signal from said amplifier after passage through a number $b$ of gain controlled amplifier stages, means for comparing the amplitudes of said removed second signal and said third signal to derive a control signal, means for controlling the gain of selected stages of said amplifier in accordance with the amplitude of said control signal, and means for removing said first signal from said amplifier after passage through a number $a$ of said gain controlled amplifier stages.

13. An arrangement for processing a first electrical signal A having a given recurrence rate to derive an output signal equal to $$AB^{\frac{a}{b}}$$

said arrangement comprising an amplifier having a plurality of cascaded stages, a source of a second electrical signal having a constant amplitude, means for simultaneously applying said first and second signals to said amplifier, a source of a third electrical signal B, of said given recurrence rate, means for removing said second signal from said amplifier after passage through a number $b$ of gain controlled amplifier stages, means for comparing the amplitudes of said removed second signal and said third signal to derive a differential amplitude signal, means for controlling the gain of selected stages of said amplifier in accordance with the amplitude of said differential signal, and means for removing said first signal from said amplifier after passage through a number $a$ of said gain controlled amplifier stages.

14. In combination, means for transmitting waves toward a remote object, a source of monitoring waves having a given time-amplitude characteristic, means for receiving said monitoring waves and the transmitted waves returned from said object, a circuit for recurrently varying the sensitivity of said receiving means as a predetermined function of time, said circuit comprising a source of signals having an instantaneous amplitude during each recurrence rate period which varies as said function of time, and means for comparing the instantaneous amplitude of said received monitoring waves with the amplitude of said signals to derive a control signal, and means for varying the sensitivity of said receiving means in accordance with said control signal.

15. In combination, means for transmitting waves toward a remote object, a source of monitoring waves having a given time-amplitude characteristic, means for receiving said monitoring waves and the transmitted waves returned from said object, a circuit for varying the sensitivity of said receiving means, said circuit comprising a source of amplitude modulated signals and means for comparing the instantaneous amplitude of said received monitoring waves with the amplitude of said signals to derive a control signal, means for varying the sensitivity of said receiving means in accordance with said control signal.

References Cited in the file of this patent

UNITED STATES PATENTS

| | | |
|---|---|---|
| 2,422,069 | Bedford | June 10, 1947 |
| 2,422,334 | Bedford | June 17, 1947 |
| 2,564,694 | Huber | Aug. 21, 1951 |